US007866460B2

(12) United States Patent
Hentschel et al.

(10) Patent No.: US 7,866,460 B2

(45) Date of Patent: Jan. 11, 2011

(54) TRANSPORT DEVICE, ESPECIALLY FOR TRANSPORTING FLAT SUBSTRATES THROUGH A COATING INSTALLATION

(75) Inventors: Michael Hentschel, Dresden (DE); Steffen Lessmann, Dresden (DE); Michael Huhn, Dresden (DE); Reinhard Jaeger, Coswig (DE); Ricky C. Powell, Ann Arbor, MI (US)

(73) Assignee: FIrst Solar, Inc., Perrysburg, OH (US)

( * ) Notice: Subject to any disclaimer, the term of this patent is extended or adjusted under 35 U.S.C. 154(b) by 94 days.

(21) Appl. No.: 11/918,010

(22) PCT Filed: Apr. 7, 2006

(86) PCT No.: PCT/EP2006/003167

§ 371 (c)(1),
(2), (4) Date: Feb. 13, 2009

(87) PCT Pub. No.: WO2006/105975

PCT Pub. Date: Oct. 12, 2006

(65) Prior Publication Data

US 2009/0188776 A1 Jul. 30, 2009

(30) Foreign Application Priority Data

Apr. 8, 2005 (DE) ....................... 10 2005 016 406

(51) Int. Cl.
*B65G 13/06* (2006.01)

(52) U.S. Cl. .............. 198/781.08; 198/779; 198/781.09

(58) Field of Classification Search ................. 198/779, 198/781.08, 781.04, 781.11, 781.09, 781.03
See application file for complete search history.

(56) References Cited

U.S. PATENT DOCUMENTS

| | | | | | |
|---|---|---|---|---|---|
| 3,768,614 | A | | 10/1973 | Tabler | |
| 3,770,103 | A | | 11/1973 | Ball et al. | |
| 3,877,565 | A | * | 4/1975 | Werntz | 198/781.08 |
| 3,958,684 | A | | 5/1976 | Garzelloni | |
| 4,103,769 | A | * | 8/1978 | Jorgensen | 198/781.04 |
| 4,798,282 | A | * | 1/1989 | Sperduti et al. | 198/781.06 |
| 4,901,845 | A | | 2/1990 | Zörgiebel | |
| 4,919,256 | A | * | 4/1990 | Gebhardt | 198/781.08 |
| 5,588,523 | A | * | 12/1996 | Hara et al. | 198/781.08 |

FOREIGN PATENT DOCUMENTS

| | | |
|---|---|---|
| DE | 2 204 179 | 9/1972 |
| DE | 25 08 365 | 8/1975 |
| DE | 89 16 018 | 8/1993 |
| GB | 721 704 | 1/1955 |
| GB | 1 138 682 | 1/1969 |
| GB | 2 098 566 | 11/1982 |
| JP | 05 269410 | 10/1993 |
| JP | 08155357 | 6/1996 |
| WO | WO 01/47791 | 7/2001 |

* cited by examiner

*Primary Examiner*—James R Bidwell
(74) *Attorney, Agent, or Firm*—Steptoe & Johnson LLP

(57) ABSTRACT

The transport device especially for transporting flat substrates through a coating installation comprises a plurality of transporting rolls, which are arranged transversely in relation to the transporting direction, and supporting rolls are also provided.

11 Claims, 2 Drawing Sheets

TRANSPORT DEVICE, ESPECIALLY FOR TRANSPORTING FLAT SUBSTRATES THROUGH A COATING INSTALLATION

CLAIM FOR PRIORITY

This application claims priority under 35 U.S.C. §371 to International Application No. PCT/EP2006/003167, filed on Apr. 7, 2006, which claims priority to German Patent Application Serial No. 10 2005 016 406.4, filed Apr. 8, 2005, each of which is incorporated by reference in its entirety.

TECHNICAL FIELD

The invention relates to a transport device, especially for transporting flat substrates through a coating installation.

BACKGROUND

For transporting substrates through coating installations, various forms of transport devices are known. Such transporting devices often comprise a plurality of rolls arranged transversely in relation to the transporting direction of the substrates, on which the substrates are transported through the coating installation, with the rolls rotating. The uppermost surface lines of the rolls, i.e. the lines in which the substrates are in contact with the rolls, define the transporting plane. In this case, some or all of the rolls are driven by driving means provided for them. Such transporting devices extend through the entire coating installation, i.e. both through those regions of the coating installation that serve for the coating of the substrates and through other regions that are technically necessary for the process, for example transfer chambers, evacuation chambers, etc.

The disadvantage of such transporting devices is that, at least in the regions of the coating installation that serve for the coating of the substrates, the ends of the rolls are also coated along with them, because the rolls protrude beyond the width of the substrates to be transported, in order to be mounted at the sides of the coating installation.

The coating material deposited on the rolls builds up to form ever thicker layers, so that the rolls have to be cleaned or exchanged at relatively frequent intervals. This is on the one hand relatively work-intensive and on the other hand requires an interruption in the process that is in progress in the coating installation. As a result, the productivity of the coating installation falls and additional servicing costs are incurred.

The middle regions of the rolls are also exposed however to unwanted coating with coating material, albeit to a lesser extent. The reason for this is that the substrates to be coated are usually placed onto the transporting device at a certain distance from one another in the transporting direction. If such a gap between two successive substrates passes the coating region, the coating material also passes through the gap and in this way also coats the middle regions of the rolls of the transport device in an unwanted way.

The object of the transport device is therefore to provide a transport device of the specified type in which the unwanted coating of the rolls of the transport device is significantly reduced and so the proportion of downtimes in the running time of the coating installation is reduced.

DETAILED DESCRIPTION

Figure 1:
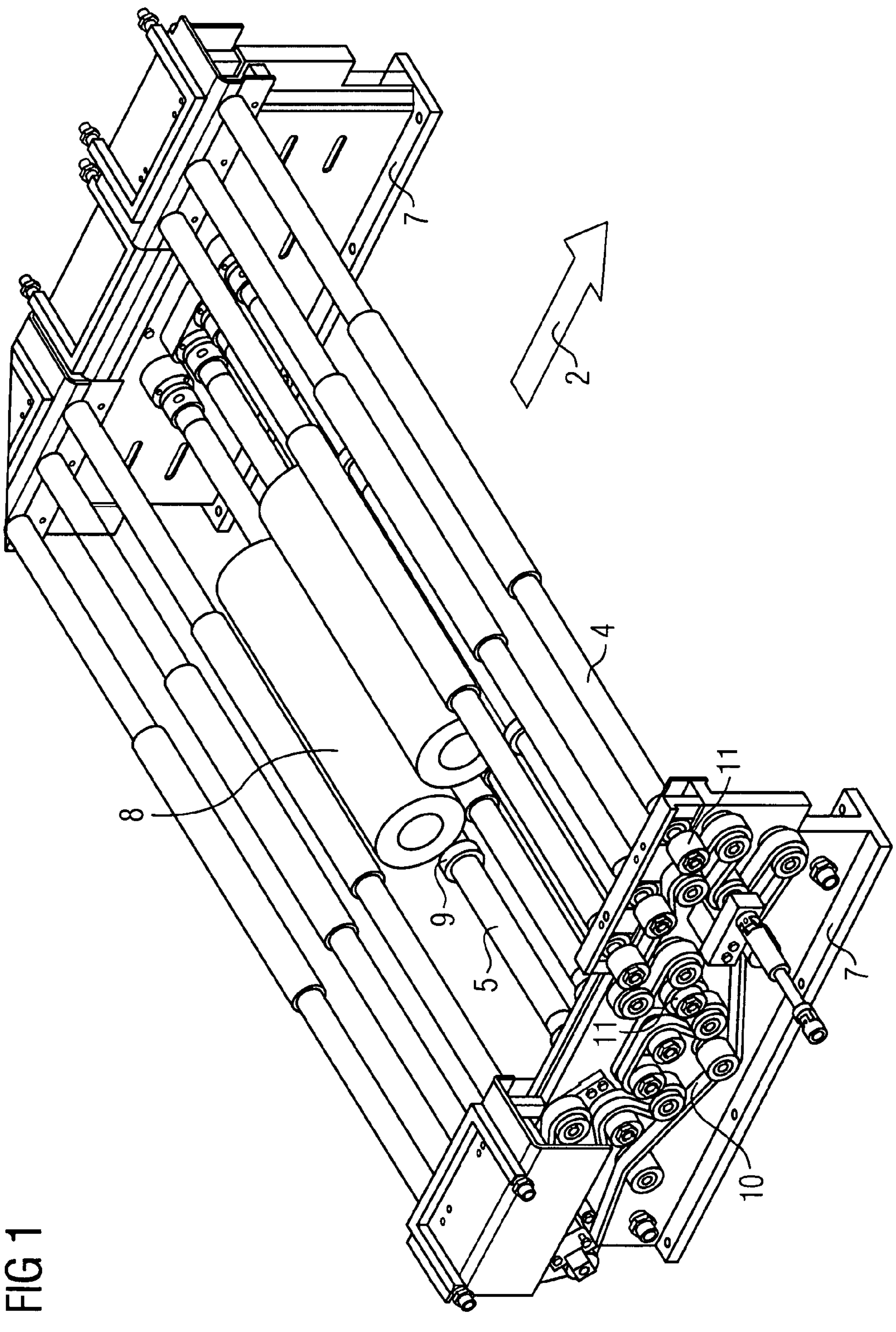
FIG. 1 shows an exemplary embodiment of the invention in a perspective view.

The transport device, especially for transporting flat substrates through a coating installation, comprises a plurality of transporting rolls which are arranged transversely in relation to the transporting direction and are rotatably mounted on both sides, the uppermost surface lines of these transporting rolls defining the transporting plane and at least some of these transporting rolls being capable of being driven, wherein at least a plurality of supporting rolls are also provided, which supporting rolls are arranged transversely in relation to the transporting direction, are rotatably mounted on both sides and are arranged in a parallel plane lying below the transporting plane.

The supporting rolls are expediently arranged in those regions of the coating installation in which the substrates are coated, i.e. in regions of the coating installation in which for example evaporators are arranged. The arrangement of the supporting rolls below the transporting plane means that they are affected to a lesser extent by the unwanted coating. The supporting rolls can at the same time serve for receiving further aids for transporting the substrates through the coating zone, as explained below.

Advantageously, seen in the transporting direction, no transporting rolls are provided in regions in which supporting rolls are arranged. As a result, in the coating zone no transporting rolls are located in the vicinity of the substrates, so that the latter also cannot be coated in an unwanted way.

Also advantageously, the transporting rolls and the supporting rolls are of substantially the same length. This makes it possible for the mounting structure of the transporting device to be of a simpler design, so that it can be produced at low cost.

Particularly advantageously, the transporting rolls and the supporting rolls are therefore mounted on both sides, in a respective common bearing support. This is made possible by the transporting rolls and the supporting rolls being of substantially the same length. The bearings of the two types of rolls can therefore be arranged in a common bearing support of a structurally simple configuration.

In a refinement of the invention, at least in the regions in which supporting rolls are arranged, collecting containers for coating material are provided in the space between the supporting rolls and the transporting plane, in the vicinity of the ends of the supporting rolls. The collecting containers ensure that the ends of the supporting rolls that protrude beyond the substrates are shielded from coating material, so that unwanted coating of the supporting rolls is prevented.

In a further refinement of the invention, at least one bridging roll is also provided, which bridging roll lies in parallel on two supporting rolls and the diameter of which is chosen such that its uppermost supporting line lies in the transporting plane.

The bridging roll ensures that the transporting plane is also retained in the region of the supporting rolls, so that the substrates can be transported through the coating zone undisturbed. It lies on two respective supporting rolls, so that it is rotatably mounted at its ends without bearings of its own, without being able to change its position in the transporting direction, i.e. in the radial direction of the bridging roll.

With preference, adjacent bridging rolls lie together on the same supporting roll arranged between them.

This refinement has the advantage that fewer supporting rolls are required as a result than if each bridging roll were exclusively assigned two supporting rolls. The required number of supporting rolls for N bridging rolls is therefore reduced from 2N to N+1 for each contiguous region in which bridging rolls are arranged. It must be ensured in this respect that the ratio of the diameters of supporting rolls and bridging rolls and the distance between the supporting rolls are chosen such that adjacent bridging rolls do not touch one another.

Particularly advantageously, the bridging rolls are shorter than the transporting rolls. This can achieve the effect that the bridging rolls are completely shielded from the substrates transported over them, so that the bridging rolls are not coated in an unwanted way.

Also advantageously, the supporting rolls have guiding means for the axial fixing of the bridging rolls.

Since the bridging rolls lie on the supporting rolls without bearings of their own, they may be axially displaced over time in relation to the supporting rolls, for example on account of small deviations from circularity. This would have the ultimate effect that the bridging rolls shift to one end of the supporting rolls, and would be exposed to unwanted coating. This can be prevented by providing guiding means, for example peripheral beads on the supporting rolls.

In a refinement of the invention, at least some of the supporting rolls can be driven.

This is not absolutely necessary, but may be advisable, in particular in the case of coating zones of a long extent, i.e. regions with a multiplicity of supporting rolls arranged one behind the other, in order to ensure undisturbed and continuous transport of the substrates.

In an advantageous development of the invention, the transporting rolls and supporting rolls can be driven by a common driving means with a power transmission means.

The apparatus-related expenditure, and consequently the costs, of the transport device can be considerably reduced as a result. In addition, synchronous running of the transporting rolls and supporting rolls is ensured.

Advantageously, the power transmission means is an inverted tooth chain.

Inverted tooth chains have low wear and are robust, and in this way contribute to making the transport device highly reliable. Furthermore, on account of the material used, inverted tooth chains generally withstand higher temperatures than, for example, belts made of polymer materials.

Also advantageously, the inverted tooth chain has toothing on both sides.

With an inverted tooth chain toothed on both sides, gear wheels arranged in a line can be driven with greater certainty and efficiency if toothed pressing rollers are arranged in the interspaces between them, since smaller angles of wrap are then adequate for load transmission.

Particularly advantageously, the inverted tooth chain engages in sprockets with involute toothing, which are provided at the ends of the transporting rolls and/or the supporting rolls.

The use of involute-tooth sprockets brings about a reduction in the polygon effect observed in the case of conventional chain drives, and consequently has the effect of producing smoother running and less wear.

Represented in FIG. 1 is the exemplary embodiment of the invention in which the transport device according to the invention comprises a plurality of transporting rolls 4 arranged transversely in relation to the transporting direction 2 and rotatably mounted on both sides. The uppermost surface lines of these transporting rolls 4 define the transporting plane 3. All the transporting rolls 4 can be driven.

Also provided below the transporting plane 3 are a plurality of supporting rolls 5, which are arranged transversely in relation to the transporting direction 2 and are likewise rotatably mounted on both sides. The supporting rolls 5 are arranged in a parallel plane 6 in relation to the transporting plane 3.

Seen in the transporting direction 2, the arrangement of the transporting rolls 4 has a gap. In this gap, in which no transporting rolls 4 are provided, a number of supporting rolls 5 are arranged. These supporting rolls 5 are of the same length as the transporting rolls 4 and are mounted on both sides together with the transporting rolls 4 in a respective bearing support 7.

Also provided are two bridging rolls 8, which are in parallel on two respective supporting rolls 5. The diameter of the bridging rolls 8 is chosen such that their uppermost surface line lies in the transporting plane 3, so that the substrates 1 (not represented here) can be transported undisturbed.

The bridging rolls 8 are shorter than the transporting rolls 4, so that they are completely covered by the substrates 1. The supporting rolls 5 have guiding means 9 for the axial fixing of the bridging rolls 8, which in the exemplary embodiment are configured as peripheral beads, so that the bridging rolls 8 cannot shift to the ends of the supporting rolls 5.

In the exemplary embodiment, all the supporting rolls 9 can also be driven, to be precise by a common driving means with a force transmission means 10 with the transporting rolls 4, the force transmission means 10 being an inverted tooth chain 10, which has toothing on both sides and engages in sprockets 11 with involute toothing, which are provided at the ends of the transporting rolls 4 and the supporting rolls 5.

Figure 2:
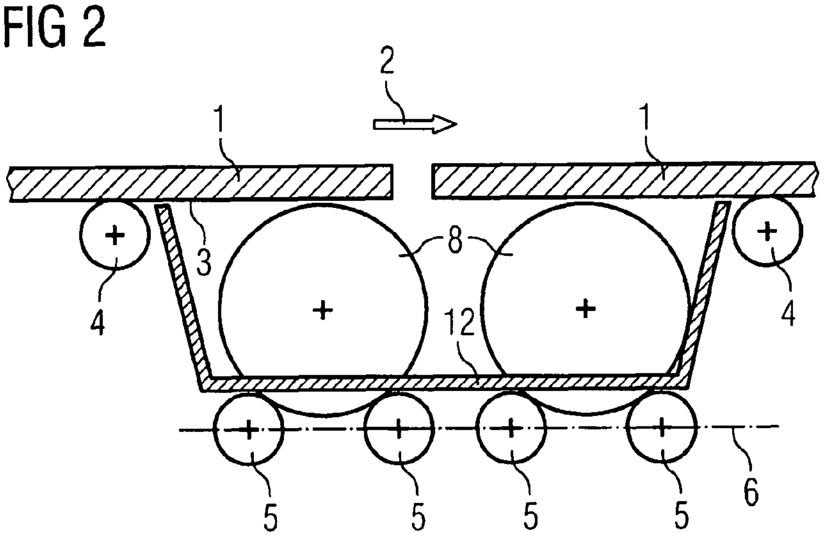
FIG. 2 shows elements of the exemplary embodiment in longitudinal section and cross section.
Figure 2:
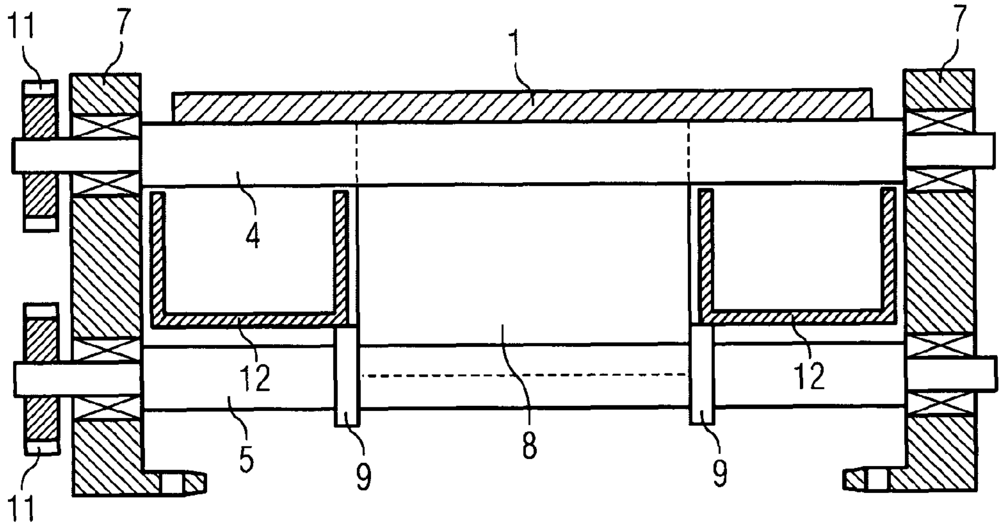

As can be seen in particular from the representations of FIG. 2, collecting containers 12 for coating material are provided in the space between the supporting rolls 5 and the transporting plane 3, in the vicinity of the ends of the supporting rolls 5.

It can also be seen that the diameter of the bridging rolls 8 is chosen such that their uppermost surface line, like that of the transporting rolls 4, lies in the transporting plane 3, so that the substrates 1 that are lying on the transporting rolls 4 and the bridging rolls 8 can be transported undisturbed.

The bridging rolls 8 are shorter than the transporting rolls 4 and are therefore completely covered by the substrates 1, so that they are protected from unwanted coating. The supporting rolls 5, on which the bridging rolls 8 lie, have guiding means 9 for the axial fixing of the bridging rolls 8, which in the exemplary embodiment are configured as peripheral beads. As a result, deviations from circularity of the bridging rolls 8 cannot lead to the bridging rolls 8 changing their position in the axial direction.

The invention claimed is:

1. A transport device, especially for transporting flat substrates through a coating installation, comprising a plurality of transporting rolls arranged transversely in relation to a transporting direction and rotatably mounted on both sides, wherein uppermost surface lines of the transporting rolls define a transporting plane and wherein at least some of the transporting rolls are capable of being driven and a plurality of supporting rolls are arranged transversely in relation to the transporting direction rotatably mounted on both sides and arranged in a parallel plane lying below the transporting plane wherein at least in regions in which supporting rolls are arranged, collecting containers for coating material are provided in a space between the supporting rolls and the transporting plane, in a vicinity of ends of the supporting roll.

2. The transport device as claimed in claim 1, wherein in the transporting direction, no transporting rolls are provided in regions in which supporting rolls are arranged.

3. The transport device as claimed in claim 1, wherein the transporting rolls and the supporting rolls are of substantially the same length.

4. The transport device as claimed in claim 3, wherein the transporting rolls and the supporting rolls are mounted on both sides, in a respective common bearing support.

5. A transport device, especially for transporting flat substrates through a coating installation, comprising a plurality of transporting rolls arranged transversely in relation to a transporting direction and rotatably mounted on both sides, wherein uppermost surface lines of the transporting rolls define a transporting plane and wherein at least some of the transporting rolls are capable of being driven, a plurality of supporting rolls are arranged transversely in relation to the transporting direction rotatably mounted on both sides and arranged in a parallel plane lying below the transporting plane, and at least one bridging roll wherein the bridging roll lies in parallel on two supporting rolls and the bridging roll has a diameter chosen such that an uppermost supporting line of the bridging roll lies in the transporting plane.

6. The transport device as claimed in claim 5, wherein adjacent bridging rolls lie together on the same supporting roll arranged between them.

7. The transport device as claimed in claim 5, wherein the bridging rolls are shorter than the transporting rolls.

8. The transport device as claimed in, claim 5 wherein the supporting rolls have guiding means for the axial fixing of the bridging rolls.

9. The transport device as claimed in claim 1, wherein at least some of the supporting rolls can be driven.

10. The transport device as claimed in claim 9, wherein the transporting rolls and supporting rolls can be driven by a common driving means with a power transmission device.

11. The transport device as claimed in claim 5, wherein at least some of the supporting rolls can be driven.

* * * * *